Nov. 22, 1932. J. L. MAUTHE 1,888,603
GAS CLEANER
Filed Oct. 27, 1931

Inventor:
JAMES LESTER MAUTHE,
by: Usina & Rauber
his Attorneys.

Patented Nov. 22, 1932

1,888,603

UNITED STATES PATENT OFFICE

JAMES LESTER MAUTHE, OF ELYRIA, OHIO

GAS CLEANER

Application filed October 27, 1931. Serial No. 571,419.

This invention relates to gas cleaners, one of the objects being the removal of undesirable liquids, fumes, and solids from gas.

Figure 2:
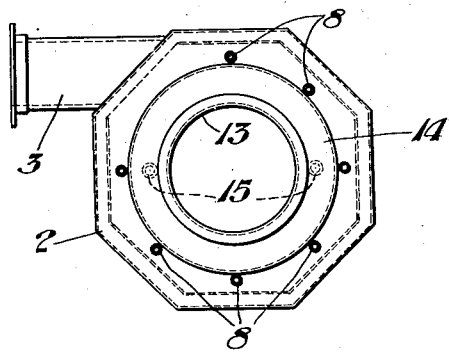
Figure 1:
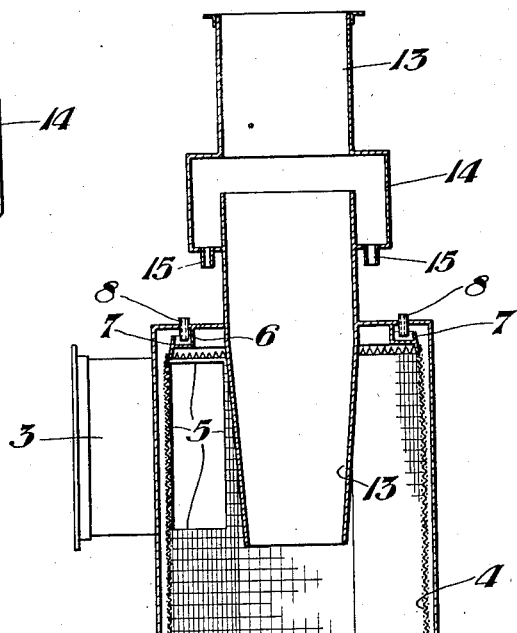
Figure 3:
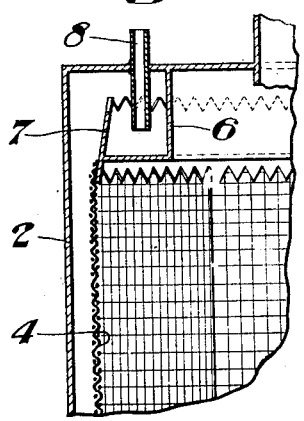

A specific example of one form of the invention is illustrated by the accompanying drawing, in which:

Figure 1 is a longitudinal cross-section.
Figure 2 is a top plan.
Figure 3 is an enlarged detail.

Having reference to this drawing, an elongated octagonal enclosure 2 is provided on one side with a gas inlet 3 for tangential gas injection. A perforated walled member 4, a meshed wire screen in this instance, is spaced from the vertical inner surface of this enclosure and has a cut-out portion 5 registering with the gas inlet 3. A trough 6 is fixed inside the inclosure 2 near its top and has a saw-tooth edged side 7 following the top edge of the walled member 4 and proximate thereto. Fluid conduits 8 pass through the top of the enclosure 2 and end over this trough.

The enclosure 2 has a centrally declining bottom 9 whose lowest parts is provided with a fluid outlet conduit 10. A horizontal baffle plate 12 is centrally positioned over the bottom 9 so as to leave a space between its edges and the inner vertical sides of the enclosure 2. A gas outlet 13 extends into the enclosure 2 in slightly tapered form, approximately one-third the latter's length.

This conduit 13 extends upward and has an interposed enlarged shell 14 having fluid outlets 15, the bottom section of the conduit extending up into this enlarged shell.

In use, gas to be cleaned is conducted to the inlet 3 by suitable means. Entering the enclosure 2 tangentially, it immediately acquires a rotary motion and is forced to follow a spiral path down toward the enclosure's bottom. The trough 6 is supplied with fluid through the conduits 8, which flows over the side 7 and down the walled member 4, the saw-tooth edges of this side causing an even distribution. The rotary motion of the gas centrifugally throws the contamination outwardly so that it impinges the walls of the member 4 and passes therethrough to the sides of the enclosure, or is carried downwardly by the curtain of fluid flowing thereover, the fluid thus absorbing the contamination and carrying it through the outlet 10. When the gas has reached the bottom of the enclosure 2 it ascends in a smaller spiral and passes through the outlet 13, the baffle 12 preventing any negative pressure possibly resulting from the shape of the bottom 9. These ascending gases retain their rotary motion as they pass through the outlet 13 so that any fluid remaining therein is thrown to the wall of the shell 14 and drains through the outlets 15.

It is to be understood that the specific example shown is in accordance with the patent statutes, and not with the intention of limiting the scope of the invention thereto, except as defined by the appended claims.

I claim:

1. A gas cleaner comprising a vertically elongated inclosure having an inlet constructed and arranged for tangential gas injection, a perforated walled member spaced from the inner vertical surface of said inclosure, a trough having an irregularly edged side following the configuration of the top edge of said member and positioned proximate thereto and means for carrying fluid to said trough.

2. A gas cleaner comprising a vertically elongated inclosure having a centrally declining bottom, an inlet for said inclosure constructed and arranged for tangential gas injection, a perforated walled member spaced from the vertical inner surface of said inclosure with an opening alined with said inlet, a trough having an irregularly edged side following the configuration of the top edge of said member and positioned proximate thereto, means for conducting fluid to said trough, a fluid outlet in the lowest part of the bottom of said inclosure, a vertical gas outlet positioned through the top of said inclosure and having interposed means for the entrapment of gas contamination and a circular baffle adjacently horizontally supported above the bottom of said inclosure and being of substantially the same diameter as said gas conduit.

In testimony whereof, I have hereunto set my hand.

JAMES LESTER MAUTHE.